United States Patent
Michaelis et al.

(10) Patent No.: US 6,542,250 B1
(45) Date of Patent: Apr. 1, 2003

(54) METHOD OF THREE-DIMENSIONALLY MEASURING OBJECT SURFACES

(76) Inventors: Bernd Michaelis, Am Weidenring 12, D-39175 Biederitz (DE); Peter Albrecht, Jakobstrasse 36, D-39104 Magdeburg (DE)

( * ) Notice: Subject to any disclaimer, the term of this patent is extended or adjusted under 35 U.S.C. 154(b) by 391 days.

(21) Appl. No.: 09/598,868
(22) Filed: Jun. 21, 2000

(30) Foreign Application Priority Data

Jun. 21, 1999 (DE) .......................................... 199 28 341
May 26, 2000 (EP) ............................................ 00890170

(51) Int. Cl.$^7$ .............................................. G01B 11/24
(52) U.S. Cl. ......................... 356/601; 356/603; 356/607
(58) Field of Search ................................. 356/601, 602, 356/603, 604, 605, 606, 607, 608, 609, 610

(56) References Cited

U.S. PATENT DOCUMENTS 4,842,411 A    6/1989  Wood .......................... 356/376
6,396,589 B1 *  5/2002  Ebihara ....................... 356/601

FOREIGN PATENT DOCUMENTS

| DE | 39 38 714 | 5/1991 |
|----|-----------|--------|
| DE | 195 25 561 | 1/1996 |
| DE | 196 23 172 | 10/1997 |

* cited by examiner

Primary Examiner—Hung Xuan Dang
(74) Attorney, Agent, or Firm—Karl Hormann

(57) ABSTRACT

A method of optically measuring a three-dimensional surface by sequentially projecting predetermined patterns onto the surface to generate thereon a predetermined number of temporary images of different intensities. Each of the images is recorded by sensors of at least two matrix cameras and grey values are determined in a pixel by pixel manner of those images. A first approximation value is determined for calculating a first measuring point on the surface, and coordinates of this approximation value are associated on the sensor surfaces of both camera. The grey values of the images of each camera at the positions of the projected points are determined by subpixel interpolation, and a pair of grey scale gradation is detected therefrom. These steps may be repeated until a measuring point is determined by a pair of grey scale gradations analyzed to be similar.

12 Claims, 4 Drawing Sheets

METHOD OF THREE-DIMENSIONALLY MEASURING OBJECT SURFACES

BACKGROUND OF THE INVENTION

1. Field of the Invention

The invention, in general, relates to a method of taking three-dimensional measurements of an object surface and, more particularly, to a method of projecting patterns onto an object surface and of defining the object coordinates by analyzing the similarity of the grey scale gradation in images of the object surface taken by at least two matrix cameras.

2. The Prior Art

Methods heretofore known of optically measuring three-dimensional objects at close range are, for instance, photogrammetric methods or stripe-projection methods. Whereas in the stripe-projection method striped patterns which are geometrically as exact as possible are projected onto the object to be measured, the patterns used in photogrammetric methods may be more or less arbitrary.

The projector for projecting patterns onto an object surface will hereinafter sometimes be referred to a pattern projector. The device for generating an image of the object surface and the sensor for recording the intensity distribution, pixel by pixel, in the image will hereafter sometimes be referred to as matrix camera. More specifically, in the present context matrix cameras are understood to include CCD cameras and other apparatus suitable for recording an intensity distribution in a pixel by pixel manner. A point in the sub-pixel range is to understood as a position on the (camera) sensor which is positioned between pixel centers. Since it is generally assumed that the measured grey scale values are valid only for the pixel centers, the grey scale value for a point in the sub-pixel range is interpolated from surrounding pixels. For instance, bilinear interpolation is one method by which the grey value may be calculated on the basis of the surrounding four pixels. The position on the sensor of the second matrix camera, hereinafter sometimes referred to as the corresponding point, may be determined relative to a selected pixel of the sensor of a first camera by projecting the same portion of the surface of the body to be measured on the selected pixel and on the corresponding point.

In the simplest case, the measurement structure for practicing a stripe-projection method consists of a pattern projector for projecting a striped pattern, a matrix camera of the kind disclosed, for instance, by German patent specification 3,938,714, and the object to be measured. The form or shape of the stripes projected onto the surface and affected in a determined manner by the object, is recorded by the sensor and may be evaluated by a computer connected therewith.

The so-called phase shift method is a special method which ensures relatively high accuracy of the measured 3D-coordinates. Essential aspects of the evaluation of the intensity distributions recorded by the matrix cameras relate to defining the absolute order of the individual stripes as well as the phase position of each image point. For the latter, $N \geq 3$ individual exposures of the object surface are sequentially taken, with the periodic striped pattern projected onto the object surface being shifted by an nth part of the stripe period between each exposure. Accordingly, a set of N individual images is obtained for each image point.

However, measuring coordinates in this manner suffers from a disadvantage inherent in the phase-shift method, i.e. the need for calibrating the pattern projector. This is because of the principle which requires defining the 3D coordinates by means of the matrix camera and the projector, i.e. by triangulation generally. Accordingly, the projector has to perform a function which is usually assumed by the camera. In general it is, however, more difficult or complex to calibrate a projector than it is to calibrate a camera. Moreover, the distortion parameters are generally larger and cannot be as easily determined as in the case of a camera. This, in turn, may result in a greater uncertainty in the calculation of the spatial coordinates.

A further problem arises from the fact that oftentimes the grey scale gradation of the stripes is not sinusoidal in a way which may be considered to be ideal. Any such deviations may have a direct distorting effect on the results of the measurement and lead to a lower accuracy of the measurements.

In photogrammetric methods, the calculation of the coordinates of the surface is based upon images of the object surface taken by at least two cameras. One advantage of photogrammetry is its high measuring accuracy. Yet where only one pair of images is used, measurements may become critical at or near strong curvatures or other irregularities in the object surface. The reason for this is that the position of corresponding image points is usually determined by analyzing similarities in the grey scale gradation of two camera images within a defined measuring area of but a few, e.g. 15×15, pixels. Usually, it is the maximum of the correlation function or the minimum of the sum of the square of errors of these two grey scale gradations which is used as a measure of the similarities.

Accordingly, the accuracy of measurements obtained by this method is strongly dependent upon the size of the measured surface and critical surfaces, i.e. strongly curved or highly irregular surfaces generally cause systematic measurement errors. While this disadvantage could be lowered by reducing the size of the measurement surface, it would result in a reduced number of pixels for analyzing the grey scale gradation and, therefore, in a less exact position of the corresponding points determined by an analysis of the similarities. Accordingly, seeking to solve the problem in this manner would seem at best to be of limited usefulness.

An alternative measuring method has been disclosed by German Patent specification DE 196 23 172 in which the correlation surface consists of but one pixel. The method can be realized by initially projecting a sequence of n (for instance 12) different patterns onto an object surface and by recording a corresponding number of image pairs. Accordingly, a sequence of n grey values becomes available of a pixel selected by one camera. The correlation coefficient between this sequence of grey values and the sequence of grey values of a point of the other camera is drawn upon to determine the corresponding point. The algorithm is based upon a search for the correlation maximum along the epipolar line. The method suffers from the drawback that it is not possible within the coordinate system of the object to measure either equidistantly or along predetermined directional vectors within the object coordinate system.

OBJECTS OF THE INVENTION

Accordingly, it is an object of the invention to provide for equidistant measurements in an object coordinate system in a method of three-dimensionally measuring object surfaces in which patterns are projected onto the object surface and of determining the object coordinates by analyzing the similarity of the grey scale gradation in images of the object surface recorded by at least two cameras.

Another object is to provide for measuring along directional vectors in an object coordinate system in the context of a method of the kind referred to supra.

BRIEF SUMMARY OF THE PREFERRED EMBODIMENTS

In the accomplishment of these and other objects, the invention in a currently preferred embodiment thereof provides for a method of three-dimensionally measuring an object surface in which predetermined patterns are projected onto the object surface and spatial coordinates of measuring points on the object surface are determined by analysis of the similarity of the grey scale gradation in images of the object surface recorded by at least two matrix cameras, and including the steps of:

a) each matrix camera generates a set of N sequential images whose pattern is changed by predetermined values between individual exposures, b) a first approximation point is determined for calculating a first measuring point, c) coordinates in the sensor surfaces of the two matrix cameras are correlated by mathematical projection to the approximation point or with a number of points adjacent to the approximation point, d) the grey values of the N images of each matrix camera at the positions of the projected points are determined by subpixel interpolation and a pair of grey values is derived therefrom, e) proceeding from the determined approximation point of step b), $m \geq 1$ further approximation points are determined for calculating the first measuring point and for correlating coordinates in the sensor surfaces of the two matrix cameras with these m approximation points or the number of points adjacent to the approximation point, f) the grey values in the N images of each matrix camera at the positions of the points projected in step e) are determined by subpixel interpolation and m pairs of grey scale values are derived therefrom, g) the measures of similarity of the grey scale values associated with each one of the m+1 pairs are determined, and h) the approximation point or a number of points adjacent to it for which the pair of grey scale values determined by steps e) and f) is of maximum similarity, is derived as the measuring point on the surface of the object measured.

The characteristic function of the measuring method in accordance with the invention which may be realized by a structure consisting essentially of at least two matrix cameras and a pattern projector as well as an object to be measured, is substantially as follows:

A pattern is sequentially projected N times onto the object surface to be measured at predetermined intervals such that temporarily N different intensity distributions are generated on the object surface. Accordingly, a sequence of N temporary intensity values may be correlated to each point of the surface area to be measured. For practical purposes, the structure of the pattern and the manner of the projection must satisfy the condition that in the sequence of N intensity values gradients as high as possible occur at each point of the object surface to be measured. Each one of the temporary intensity gradations generated in this manner is recorded by at least $k \geq 2$ matrix cameras. The grey values in the N images thus generated will then be determined for each camera in a pixel by pixel manner.

The first approximation point is thereafter determined so that a first measuring point on the object surface may be calculated. Coordinates on the sensor surfaces of the two matrix cameras are thereafter correlated by mathematical projection to this approximation point or to a number of points adjacent to the approximation point.

The grey values in the N images of each matrix camera at the positions of the projected points are determined by subpixel interpolation, and a pair of grey scale values is derived therefrom.

At least one further approximation point is determined near the first approximation point. Coordinates in the sensor surfaces of the two matrix cameras are in turn correlated by mathematical projection to these approximation points or numbers of points adjacent to the approximation point. Thereafter, the grey values in the N images of each of the two matrix cameras at the positions of the projected points are again determined by subpixel interpolation, and at least one further pair of grey scales is derived therefrom. In a next step the measures of similarity pertaining to each of the above mentioned pairs of grey values are determined. Thereafter, the measuring point on the surface of the measured object is determined by finding the approximation point or a number points adjacent thereto to which one of the pairs of grey scale values determined by the above steps bears a maximum similarity.

Because of its local resolution and the low degree of uncertainty of measurements made possible by it, the measuring method in accordance with the invention is particularly suited for measuring vehicle bodies or parts thereof.

In contrast to known measuring methods, measurements of high resolution may be obtained by practicing the method of the invention, and when determining a measuring point value it is possible in a simple manner to ensure that the measuring points are provided equidistantly in the object coordinate system. This is deemed to be a significant advantage over the method disclosed by German patent specification DE 196 23 172.

It is also possible to shift the approximation points along predetermined directional vectors in the object coordinate system in order to obtain a measuring point at the point of penetration of the vector through the object surface.

Other objects will in part be obvious and will in part appear hereinafter.

The rate at which the measurements can be taken can be enhanced by utilizing at least two similarity measures of grey scale gradations for determining a new approximation point. This may be accomplished, for instance, by a gradient slope method or by Newton's method. Such method would lead to the new approximation point being positioned substantially closer to the real surface of the measurement object than the first approximation points. This, in turn, simplifies the determination of the measuring point.

In an embodiment considered to be particularly advantageous, the directional vector along which the approximation points are shifted is positioned parallel to the axis of the object coordinate system related to the height coordinates of the measuring points. The measuring point may thus be determined equidistantly.

In a further advantageous embodiment of the invention the coordinates of new approximation points are determined by considering the measures of similarities correlated to a predetermined number of approximation points.

Further advantageous embodiments relate to the design of the projected patterns. Striped patterns have been found to be effective the longitudinal direction of the stripes of which imaged on the sensor planes of the matrix cameras extends substantially normal to the epipolar lines. They yield favorable grey scale gradients and, accordingly, a high information content along these lines. In turn, it has a favorable effect on the accuracy of determining the position of the corresponding points.

If possible, the grey scale values transverse of the direction of the lines should differ in the entire area to be measured. This would be the case, for instance, with a sinusoidal grey scale gradation. The necessary N different intensity distributions on the surface to be measured may be generated in different ways. In a first variant, for instance, the striped pattern may be shifted by a fraction of its period between individual images. In another variant, the different intensity distributions may be obtained by the projection of striped patterns of differing period or by a combination of both variants.

In yet another embodiment of the invention the projected patterns are of a stochastic or random structure. In that case, the sequentially different intensity distributions on the surface of the object are generated by translation and/or rotation of the projected pattern, or by changing the structure or outline of the pattern.

BRIEF DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

DETAILED DESCRIPTION OF THE PREFERRED EMBODIMENTS.

The following three examples are based upon measuring of a door of an automobile.

EXAMPLE 1

Figure 1:
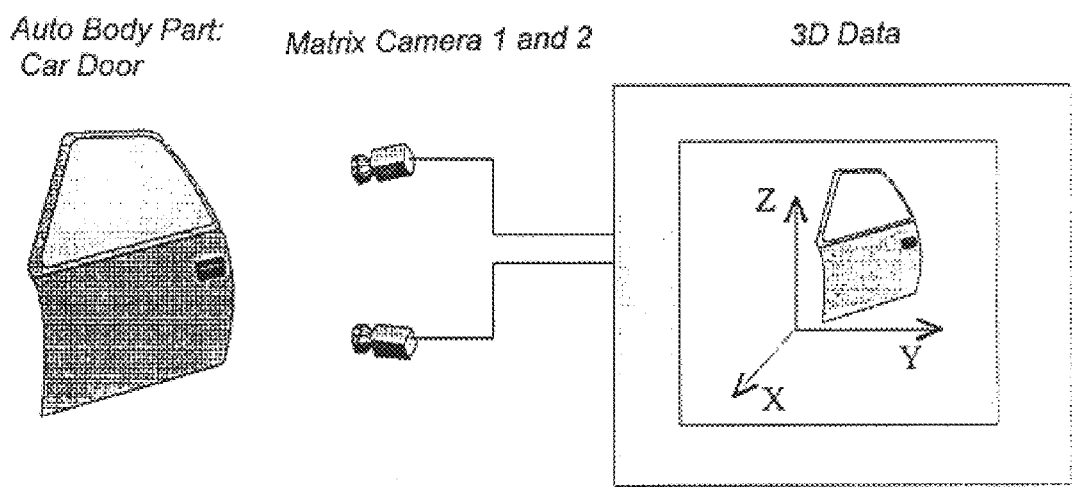
FIG. 1 is a schematic presentation of the measurement structure for measuring the door of an automobile, in accordance with the invention.
Figure 2:
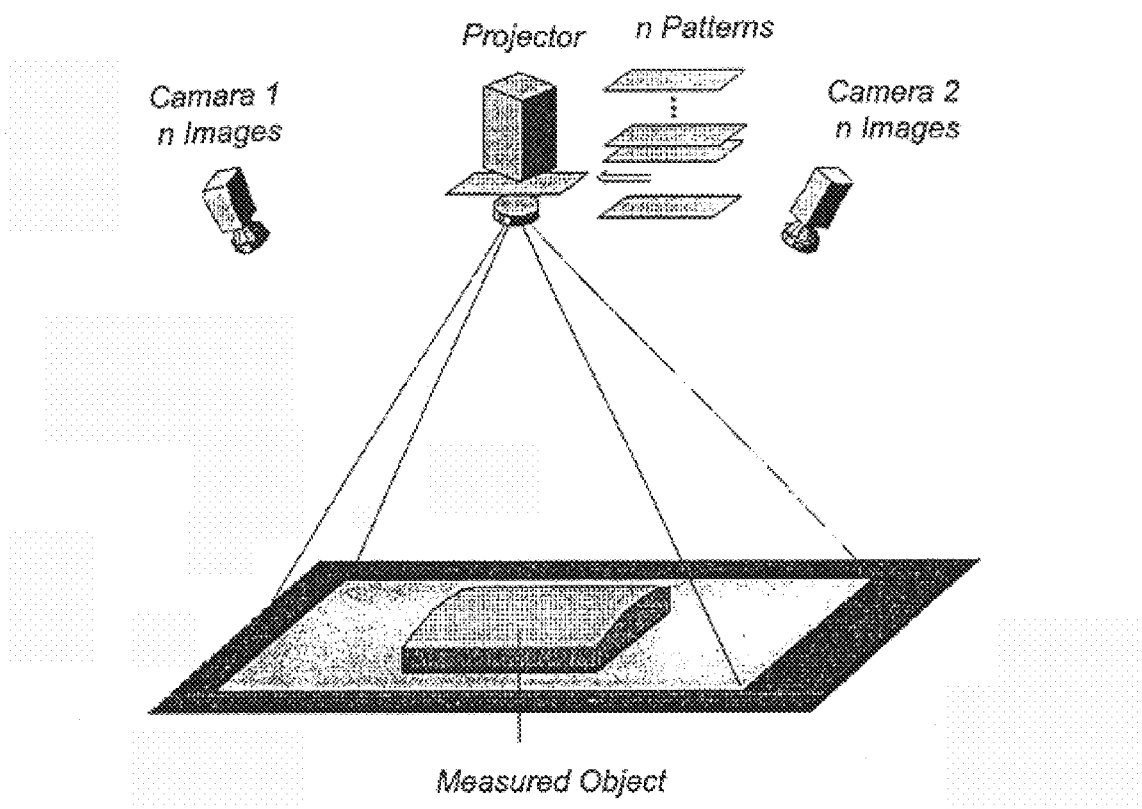
FIG. 2 is a schematic presentation of a measurement structure for practicing the method in accordance with the invention, including a pattern projector for projection a plurality of patterns onto the object to be measured.

Approximation of the Surface by an Approximation Point Having a Variable Z-coordinate This example presupposes a spatial point movable parallel to the Z axis for approximating the surface. As shown in FIG. 2, N (e.g. 12) different patterns are sequentially projected onto the surface of the object to be measured and a corresponding number of images is recorded. The increased quantity of information resulting therefrom yields a measurement of high spatial resolution.

Figure 3:
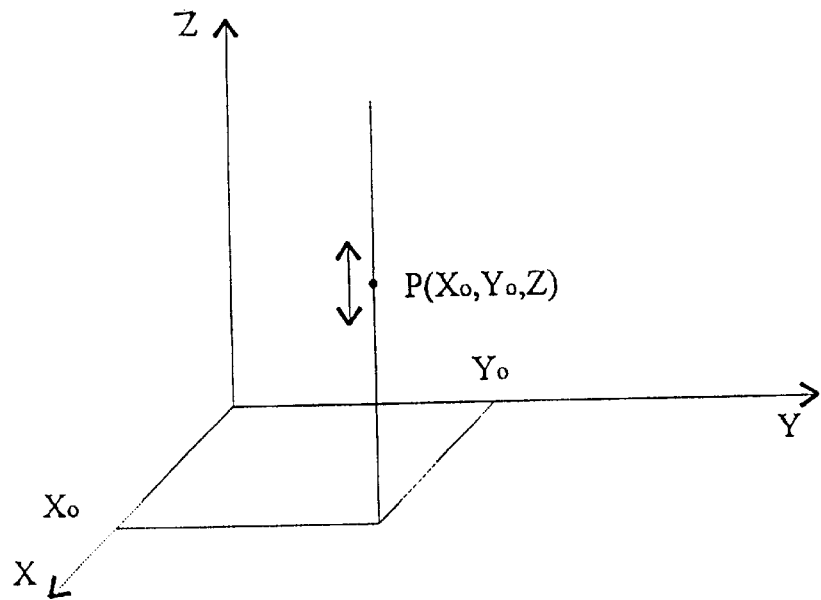
FIG. 3 is a coordinate system including an approximation point which may be shifted along a vertical coordinate.

The starting point for determining a 3D surface coordinate is an approximation value. It may be derived in various ways, as, for instance, by the use of grey-coded patterns. The coordinates of the approximation value are assumed to be $X_0, Y_0$ and $Z$ (FIG. 3). While iteratively approaching the real surface, $X_0$ and $Y_0$ remain constant. Only the Z coordinate changes. This results in a measurement vertically of the X-Y plane of the spatial coordinate system. It is thus possible to define a surface coordinate for a predetermined position of $X_0, Y_0$. This leads to the possibility of measuring 3D points in an equidistant raster.

Figure 4:
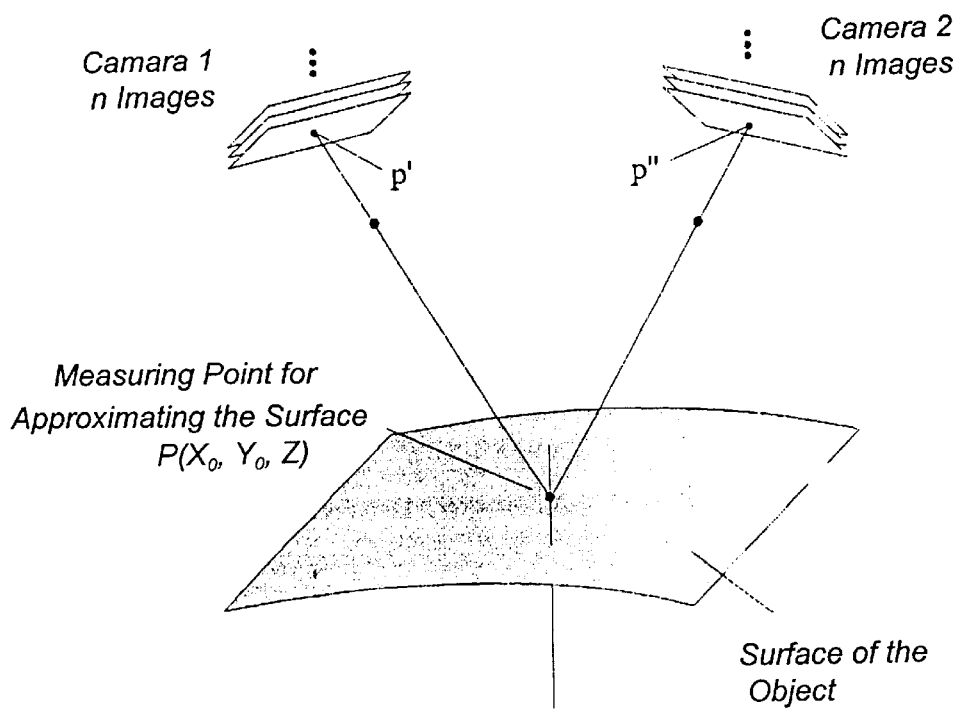
FIG. 4 is a schematic presentation of the projection of an approximation point onto the sensor surfaces of the cameras for obtaining two grey scale values.
Figure 4:
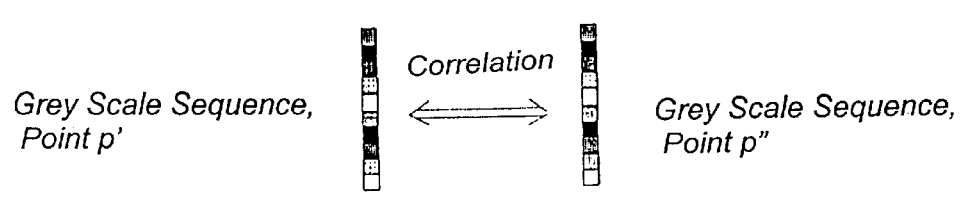

The first step within the iteration cycle constitutes the mathematical projection of the actual spatial point onto both sensor surfaces (FIG. 4). The calculation is performed on the basis of a colinearity equation:

$$x = c \cdot \frac{r_{11} \cdot (X_0 - X_T) + r_{12} \cdot (Y_0 + Y_T) + r_{13} \cdot (Z - Z_T)}{r_{31} \cdot (X_0 - X_T) + r_{32} \cdot (Y_0 - Y_T) + r_{33} \cdot (Z - Z_T)} + dx$$

$$y = c \cdot \frac{r_{21} \cdot (X_0 - X_T) + r_{22} \cdot (Y_0 - Y_T) + r_{23} \cdot (Z - Z_T)}{r_{31} \cdot (X_0 - X_T) + r_{32} \cdot (Y_0 - Y_T) + r_{33} \cdot (Z - Z_T)} + dy$$

wherein: dx, dy are terms descriptive of image errors or distortions and $X_0, Y_0, Z$ are coordinates of the spatial point for approximation of the surface.

The distortions by the lenses are compensated by the terms dx and dy descriptive of image errors. This permits a substantially exact mathematic modeling of the actual exposure condition.

The result of the projections are two points p' and p" with defined values in the subpixel range of the sensor coordinate systems. It is, therefore, possible to assign to these points the corresponding grey values from the real exposures. This is accomplished by a calculation from the grey values of the surrounding pixels by subpixel interpolation. In this manner, each of the two points is assigned a grey value from each exposure and, hence, N grey values from all of the images taken. These grey values form the grey value sequence (FIG. 4).

The cross correlation coefficient between the two grey value sequences may be used as a criterion for determining the corresponding pair of points. At a maximum cross correlation coefficient it will be assumed that the two projected points are corresponding ones. The spatial point may in that case be considered as an approximation of the real surface and thus as a measuring point.

Figure 5:
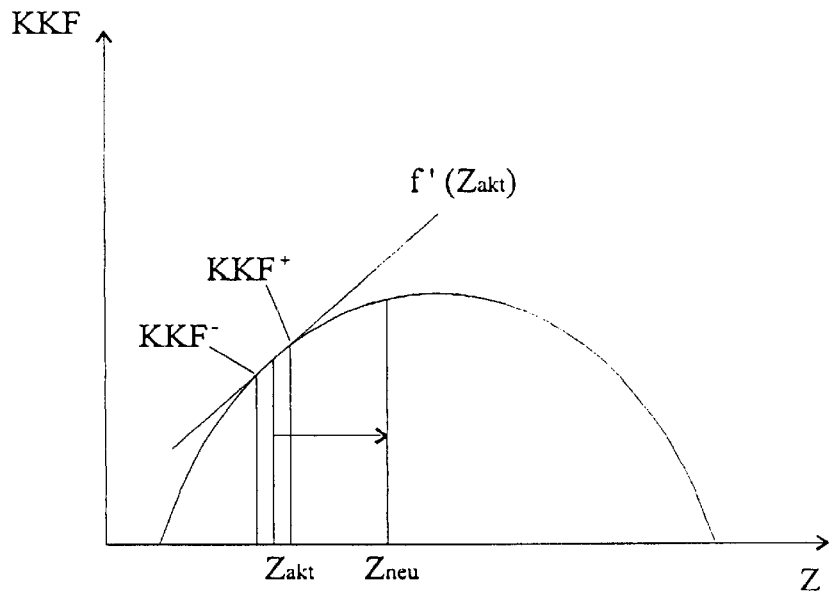
FIG. 5 depicts the determination of a new approximation point on the basis of a known approximation point by a gradient slope process.

The search for the maximum position may be realized by means of the gradient slope process as follows:

Initially, the increase of the cross correlation function is required for the actual Z-coordinate. For this purpose, the Z-coordinate is reduced and increased by a small quantity dZ, and the projections onto the image planes are calculated. The two corresponding correlation values of the grey value sequences (FIG. 5) are used to defined the increase:

$$f^l(Z_{akt}) \cong \frac{KKF^+ - KKF^-}{2} \cdot dZ$$

wherein:
 $f(Z_{akt})$ is the increase of the cross correlation function at the actual Z-coordinate;
 $KKF^+$, $KKF^-$ are correlation values at variable Z-coordinates.

Proceeding from this value a better spatial coordinate $Z_{neu}$ may be obtained:

$$Z_{neu} = Z_{akt} + \lambda \cdot f'(Z_{akt})$$

wherein:
$\lambda$ is the factor for determining the iteration width.

It is possible in this manner iteratively to approach the maximum until recedes below a predetermined termination threshold. The corresponding Z-coordinate is the measuring point at position $(X_0, Y_0)$.

EXAMPLE 2

Approximation of the Surface by an Approximation Point Based Upon a Directional Vector.

Figure 7:
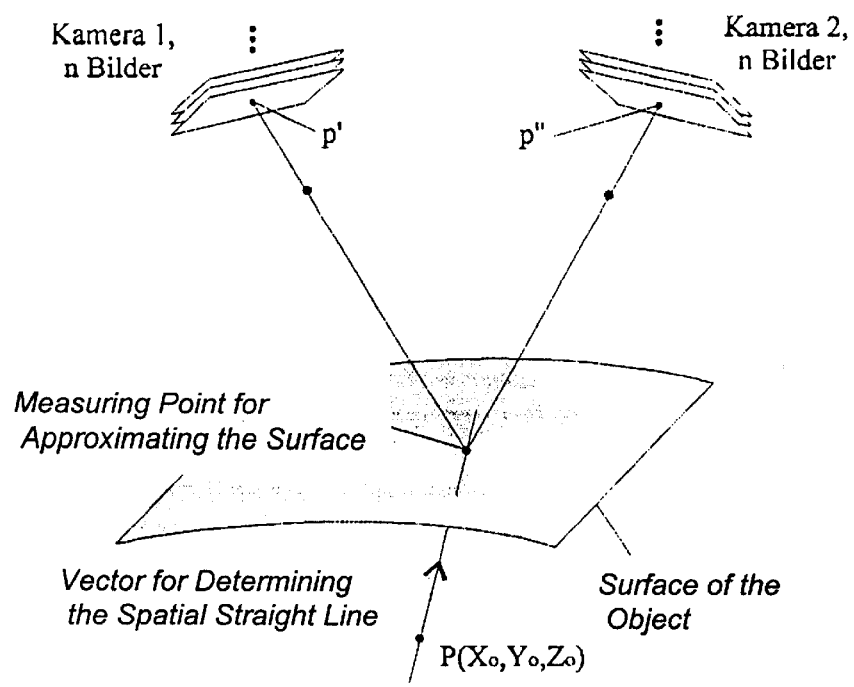
FIG. 7 depicts the determination of a measuring point along a predetermined directional vector.
Figure 7:
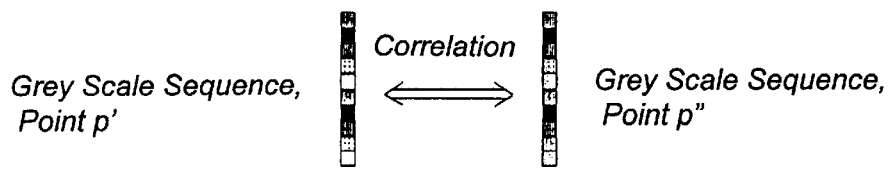

In certain applications it is desirable to perform the iterative 3D measurement vertically relative to the expected surface of the measured object or in a predetermined defined direction within space (FIG. 7). The reason for it usually is the result of routines for the further processing of the "cloud" of 3D points in which data measured in this fashion is required for further processing.

Figure 6:
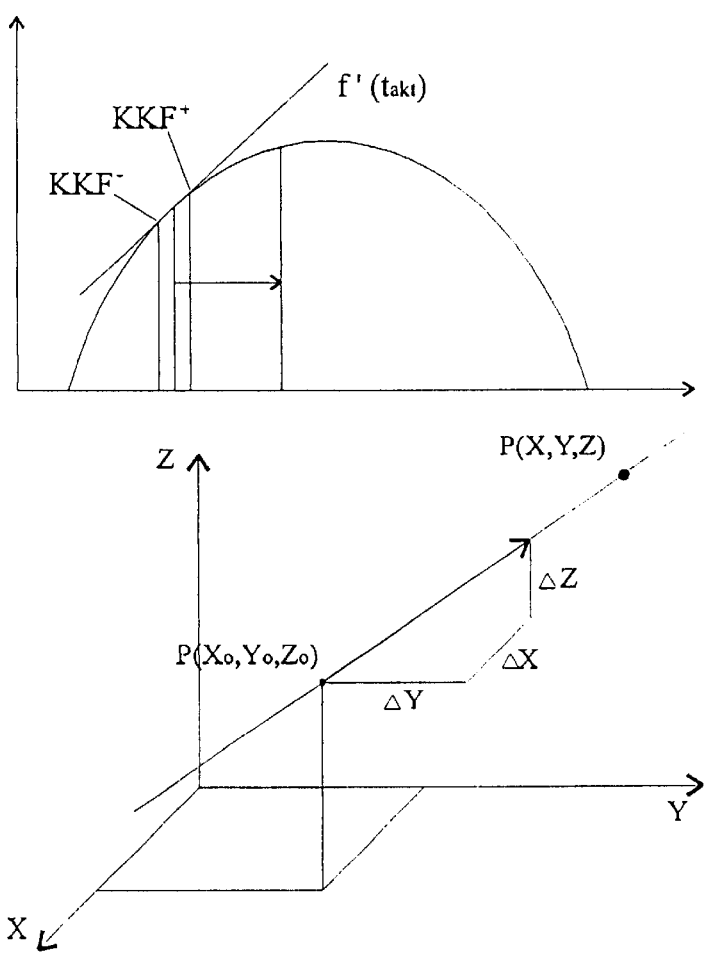
FIG. 6 depicts the determination of approximation points along a predetermined directional vector.

To realize this requirement, iterative shifting of the approximation point is performed along a straight line in space, the position of which may be vectorially defined (FIG. 6). To this end the so-called point-direction-form may be used:

$$X = X_0 + t \cdot \Delta X$$
$$Y = Y_0 + t \cdot \Delta Y$$
$$Z = Z_0 + t \cdot \Delta Z$$

wherein:
X Y, Z are coordinates of a point on a straight line in space
t; parameter for determining the point on the straight line in space
$X_0, Y_0, Z_0$ are coordinates of the base point of the vector
$\Delta X, \Delta Y, \Delta Z$ are parameters of the directional vector.

In this context, the vector parameters $(X_0, Y_0, Z_0)$ and $(\Delta X, \Delta Y, \Delta Z)$ may also be interpreted as approximation values. They may be derived, for instance, from a previous measurement of the surface by another method. The basic approach for determining the surface point corresponds to the one of

EXAMPLE 1 projection of the spatial point onto both sensor surfaces;
associating the grey value sequence to the projection points p' and p" (FIG. 7);
search for the correlation maximum by a gradient slope process.

However, in a directionally based measurement the parameter t forms the basis of the iterative approximation. Changing this parameter causes the approximation point to shift along the set straight line in space. This is a broadening of the method limited to a measurement vertically of the XY plane of the spatial coordinate system. It makes possible iteratively to determine, in a manner similar to the gradient slope process (as in Example 1), the point which may be interpreted as the point at which the straight spatial line penetrates through the surface of the measured object.
Example 3

Approximation of the Surface by 3×3 Spatial Points

Figure 8:
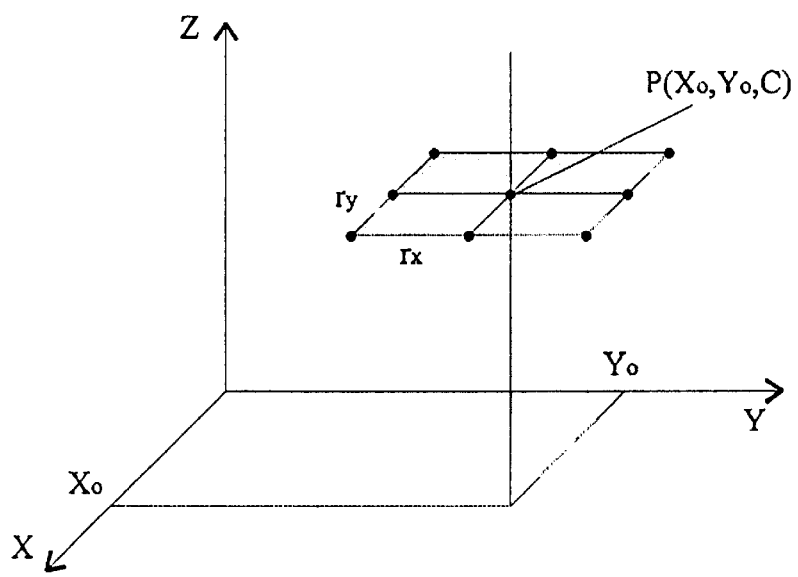
FIG. 8 depicts a model surface of 3×3 spatial points for approximating the surface of an object to be measured.

In this example 3×3 spatial points are used for approximating the surface. The reason for doing it is the desire to decrease the statistical uncertainty of the measurement. However, since this is not substantially to deteriorate the spatial resolution, it is limited to 3×3 spatial points. The basis of the calculations is a 3×3 point mask in a spatial coordinate system disposed in a plane (FIG. 8). The following equations are used to define these points mathematically:

$$x_i = X_0 + (i-1) \cdot \frac{R_x}{\sqrt{1+A^2}}$$

$$Y_j = Y_0 + (j-1) \cdot \frac{r_y}{\sqrt{1+B^2}}$$

wherein:
I, j=0 . . . 2 (number of points);
$X_0, Y_0$ are the center point coordinates of the surface of the model;
A is the increasing or decreasing slope in the X direction;
B is the increasing or decreasing slope in the Y direction;
C is the height coordinate at position $X_0, Y_0$;
$r_x, r_y$ is the distance between two neighboring spatial points in the X or Y direction, as the case may be, and is usually set such that the distance between projected points is about 1 pixel.

By varying the height C as well as the two slopes A and B the model surface may be approximated to the actual surface. The approach or method corresponds to the one described in Example 1.

Initially, two 3×3 spacial points are projected onto the sensor surfaces of the camera. Grey values from the two image sequences may now be associated with the projection points. This is followed by a search for the correlation maximum by a gradient slope process. At the same number of images there will be nine times as many grey values as in the case of one spatial point only (Example 1). The statistical uncertainty of the measurement should, therefore, be smaller.

What is claimed is:
1. A method of optically taking a three dimensional measurement of a surface of an object by projecting a predetermined pattern onto the surface and determining the spatial coordinates of measuring points on the surface by analyzing grey value gradations in images of the surface recorded by at least two matrix cameras, comprising the steps of:
   a) sequentially generating by each camera a set of N images, the projected pattern being changed between individual exposures;
   b) determining a first approximation point for calculating a first measuring point;
   c) correlating coordinates in the sensor surfaces of the two matrix cameras to the approximation point by mathematical projection;
   d) determining the grey values in the N images of each matrix camera at the positions of the projected points by subpixel interpolation and deriving therefrom a pair of grey value gradations;
   e) proceeding from the approximation point of step b, determining $m \geq 1$ further approximation points for calculating a first measuring point and associating coordinates in the sensor surfaces of the two matrix cameras to the m approximation points;
   f) determining the grey values in the N images of each matrix camera at the positions of the points projected according to step e by subpixel interpolation and deriving therefrom m pairs of grey value gradations;

g) determining the measures of similarity of the grey value gradations associated to each of the m+1 pairs; and h) determining as a measuring point on the surface the approximation point having maximum similarity to the pair of grey value gradients determined by steps e and f.

2. The method of claim 1, wherein the projected pattern is changed by shifting.

3. The method of claim 1, wherein the projected pattern is changed by rotation.

4. The method of claim 1, wherein the projected pattern is changed by changing the structure thereof.

5. The method of claim 1, wherein coordinates in the sensor surfaces of the matrix cameras are associated to a plurality of points adjacent to the approximation point.

6. The method of claim 1, wherein a new approximation point is determined by the measures of similarity of at least the grey value gradations.

7. The method of claim 6, wherein a measuring point positioned at the point of penetration of a directional vector through the object surface is obtained by shifting the approximation points along the directional vector in an object coordinate system.

8. The method of claim 7, wherein the directional vector is disposed in parallel to the axis of the object coordinate system relating the height coordinates of the measuring points.

9. The method of claim 1, wherein the coordinates of a new approximation point are determined by the measures of similarity associated to a predetermined number of approximation points.

10. The method of claim 1, wherein the projected patterns are of a periodic striped structure extending substantially vertically of the epipolar lines of the sensor surface and wherein the sequential patterns differ from each other by the stripes being shifted by a predetermined fraction of their period.

11. The method of claim 1, wherein the projected stripes are of a stochastic structure and wherein the sequential patterns differ from each other by displacement by a predetermined amount.

12. The method of claim 1, wherein the projected stripes are of a stochastic structure and wherein the sequential patterns differ from each other by being structured distinctly from each other.

* * * * *